Nov. 24, 1936.  McLENNEN C. SLATE  2,061,924
COMBINATION SCRAPER AND BULLDOZER
Filed Jan. 7, 1935   3 Sheets-Sheet 1
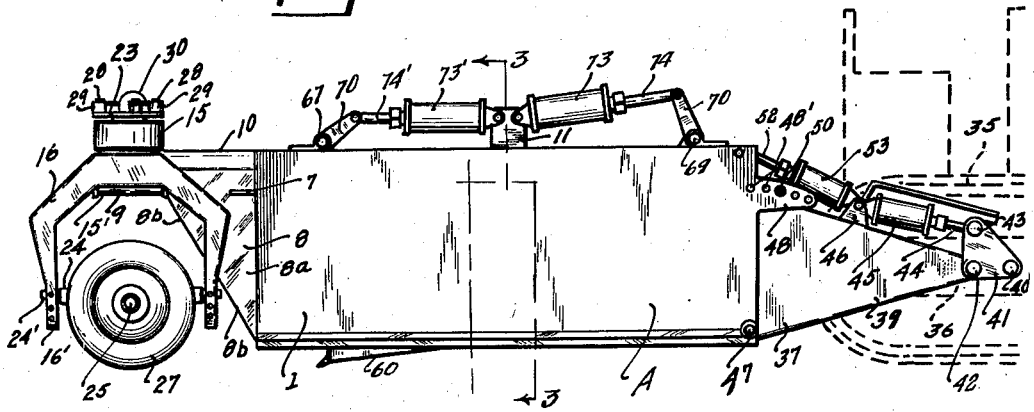
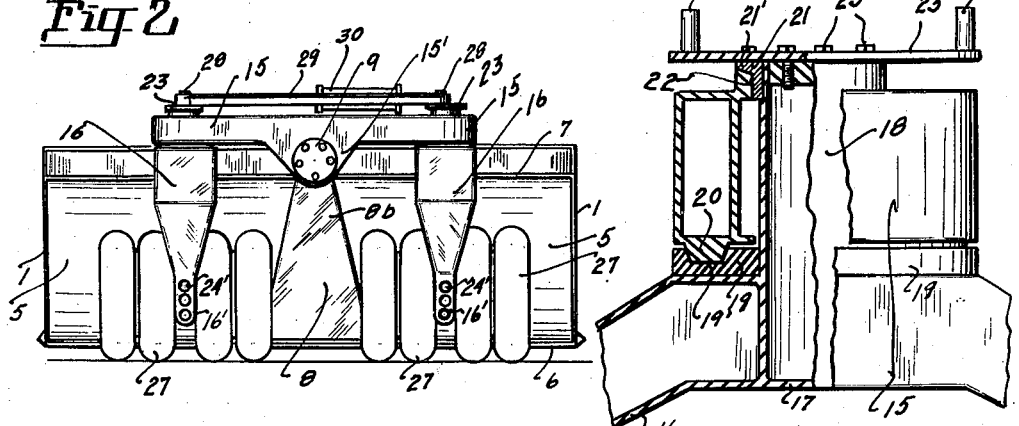
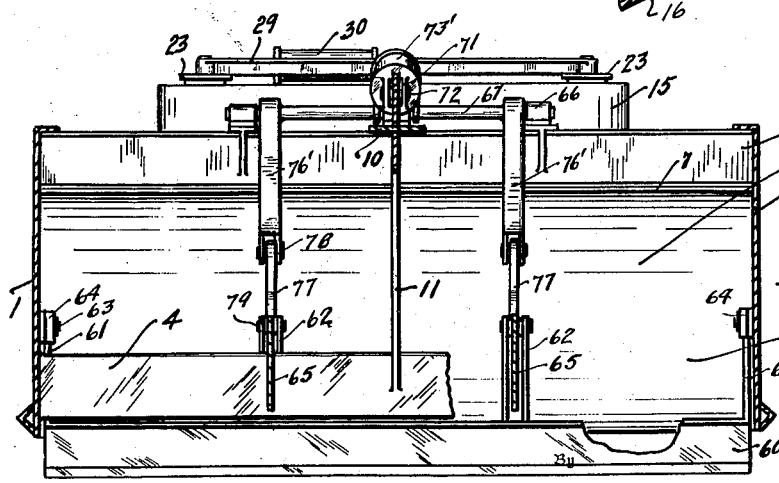
Inventor
McLennen C. Slate

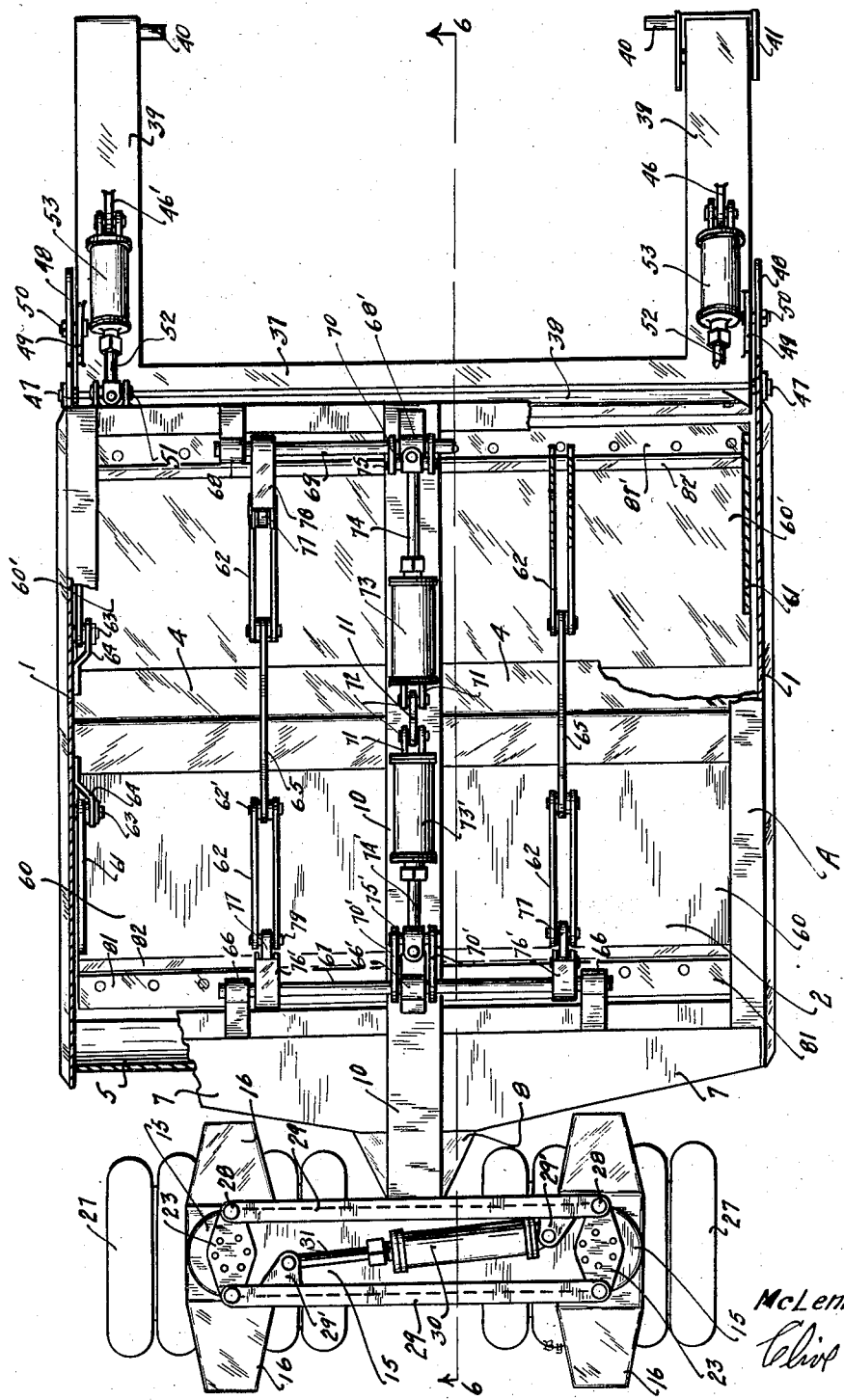

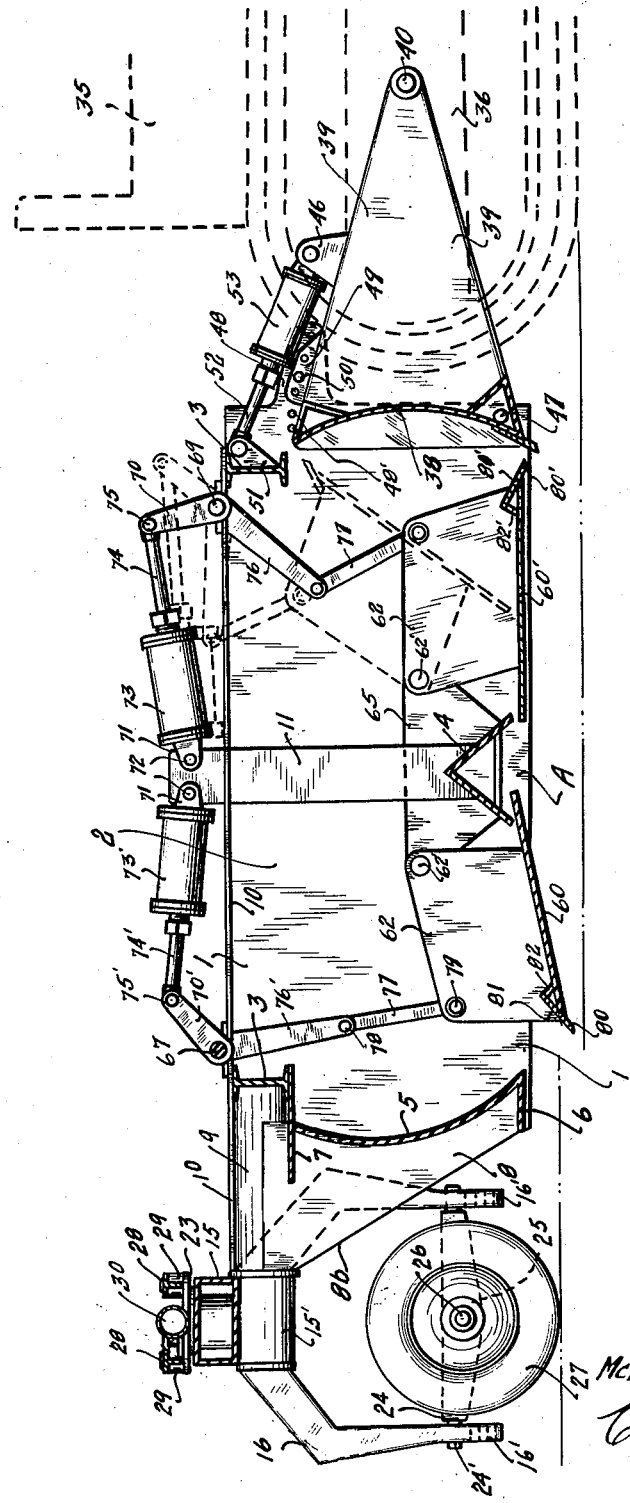

Patented Nov. 24, 1936

2,061,924

UNITED STATES PATENT OFFICE 2,061,924

COMBINATION SCRAPER AND BULLDOZER

McLennen C. Slate, Albany, Oreg.

Application January 7, 1935, Serial No. 699

20 Claims. (Cl. 37—129)

My invention relates primarilly to improvements in machinery for road and highway construction, and for other purposes requiring scraping, grading, leveling, transportation and disposal of earth, gravel and under certain circumstances, stone. The primary objects of the invention is to provide a machine or apparatus for removing, moving and spreading or otherwise disposing of large quantities of earth material.

Furthermore the object of the invention contemplates such machine or apparatus being operated by heavy draft whereby it may be subjected to and is capable of withstanding severe strains, abrupt starts, stops or reversals in movement, and overloads.

Again the object of the invention concerns itself with the operating scope or maneuvering of a machine or apparatus of the type of the present invention, essentially such object being to reduce and substantially eliminate unnecessary maneuvering and to this end the present invention is designed to avoid the necessity of reversals, or otherwise stated, the invention functions with equal results regardless whether traveling in a forward direction or in the reverse. Thus it will be seen that such invention will be and is particularly suitable for operation under restricted conditions, such as in deep earth cuts or on long fills in grade construction conditions.

The object of the present invention is the provision of a machine or apparatus having a diversity of functions, that is to say, a machine or apparatus for transporting earth, though not essentially limited to the transporting of such material; for leveling earth, for scraping earth, for spreading earth, and so forth.

The object of the invention also concerns itself with ease and certainty of operation of the present machine or apparatus, and in accordance with this object, mechanical means for controlling the functions of the invention have been incorporated therein, and these have been designed to ensure positive control of the machine or apparatus at all times and under all conditions.

The object of the invention is to incorporate in one machine or apparatus the functions and operations which have heretofore been supplied by numerous machines individually, thus very materially reducing expenses previously incurred through necessity in having individual machines to perform each of the operations performed by the present invention.

The object of the invention is to provide for visibility of operation, and in this connection it may be briefly stated that at all times the machine and apparatus and the terrain of operation are in full view of the operator thereby ensuring a maximum of efficiency in operation.

Further objects and purposes of this invention will hereafter more fully appear in the following description, an understanding of which will be aided by the drawings, wherein:—

Figure 1 is a side elevation of the invention.
Figure 2 is an end elevation.
Figure 3 is the horizontal sectional view indicated by section line 3—3 in Figure 1.
Figure 4 is a fragmentary sectional detail of one of the tiller bearings.
Figure 5 is a plan of the invention.
Figure 6 is the horizontal side sectional elevation of the invention indicated by section line 6—6 in Figure 5.

Frame—Hopper

The scraper largely embodies a frame A which is essentially a hopper body. This frame or body consists of parallel side members or sides 1 spaced apart to provide an interior hopper 2, and held in such spaced relationship at the top by beams 3 and 3', and at their intermediate bottoms by the inverted V-shape member 4, the members 2 being secured to members 1 at or proximate their ends. The rear end of the hopper 2 is closed by the end 5 which extends between and has its ends secured to the sides 1. In order to substantially reduce flexing of end 5, it is provided with a sheet or plate bracing member 6 extending along its lower rear edge, and another sheet or plate bracing member 7 along its upper edge which extends forwardly and is secured to the beam 3', also extending rearwardly a space from the end 5. These members are secured to one another by any suitable means, such as welding. Extending rearwardly of end 5 is a cantilever bracket or tiller support 8 consisting of sides 8a and rear wall or piece 8b. The forward edges of the sides 8a are curved and are welded or otherwise secured to end 5, and their upper portions being somewhat broader than their lower portions, thereby the member 8b secured thereto is at an inclination. Members 8a are also secured to plates 6 and 7 by the means stated. At the top of the bracket 8 and extending from beam 3' rearwardly is a cylindrical bearing or support 9 which projects somewhat beyond the bracket 8, the projecting portion serving a purpose hereafter described.

A longitudinal member 10 extends from beam 3 to beam 3', being connected to both beams at an intermediate point on their upper surfaces and extending somewhat along the bearing member 9, to which it is secured. A cylinder support member 11 extends from the V-member 4, to which it is secured, upwardly through longitudinal member 10, to project somewhat thereabove.

Ground supporting and steering means

A beam, wheel support member or bolster 15 is carried upon the rearmost end portion of the support 9. A rockable connection is provided between these two members in order that member 15 may tip in one direction or another, and for this purpose the bolster is sufficiently enlarged at 15' to provide a suitable bearing to fit about the member 9. As shown in the drawings, member 15 is a hollow body having rounded ends and pivoted to the support 9. In each end of the member 15 are vertical bearing apertures in which wheel yokes or support members 16 have spindles or shafts seated. In this connection, inverted U-shape members or yokes are provided in their mid, body portions or bights 17 with projecting bearing members or spindles 18 which penetrate such aperture bearings. To the upper side of the bights 17 are affixed annular bearings 19 which are provided with grooves 19' in which seats an annular bearing 20, the latter being secured to the underside of member 15. The upper end of spindle 18 terminates in an encircling bearing member 21 bearing against the inner face 22 of the member 15, and having an annular flange portion 21' bearing upon the top of member 15. To the top or upper end of the spindle 18 is secured a tiller or steering member 23 by any suitable means such as the bolts 23'. The ends 16' of yokes 16 are provided with bearing apertures in which are seated the ends or spindles 24' of the axle support member 24. In the foregoing construction, ends 16' can be supplied with more than one seat for the spindles 24', that is to say, one above the other, thereby providing for vertical adjustment of the member 24. Centered in the member 24 is an axle bearing or seat 25 in which is carried the axle or shaft 26, which, in this instance, projects an equal distance each side of member 24. Upon the projecting portions of the axle are mounted the ground wheels 27, in this instance, one each side of the member 24. Viewing Figure 6 it will be seen that the axis of the bearing 25 is somewhat below the axes of the spindles 24' so that when the member 24 is revolved one hundred and eighty degrees upon such spindles the axis of the bearing 25 will be positioned above the axes of the spindles 24'. Insofar as the frame rests upon the wheels, it will be seen that the reversal of member 24 from one position to another will raise or lower the frame A as the case may be, it being understood that such wheels support the frame.

From the foregoing description, it will be seen that two ground wheels support each yoke and consequently the four wheels through the medium of such yokes, cross member 15 and member 9 support the rear end of the frame. Inasmuch as the yokes are pivotal on a vertical axis, it will be readily seen that the direction of travel of the wheels 27 may be changed by moving such yokes in unison on their vertical axes, thus affording means for steering or guiding the frame as it is propelled along the ground. It is necessary that the yokes pivot in unison. This is accomplished through the medium of tiller members 23. Members 23 are provided with two spindles or pins 28 positioned diametrically opposite each other with regard to the axis of the spindle or bearing 18. Pivotally extending between corresponding pins 28 on each of the two members 23 is a link 29, which compel the yokes 16 to move upon their vertical axes in a corresponding degree. A nigger or fluid operated cylinder and piston provide means for controlling the axial movement of the yokes, in this instance employing a cylinder 30 pivotally connected to a bracket 29' of one of the links 29. Cylinder 30 has a piston (not shown) operating a piston rod 31 which rod is connected to a bracket 29' of the other of the links 29. Thus it will be readily understood that when the rod recedes within the cylinder 30 the yokes are turned upon their vertical axes in one direction, and when the rod proceeds from the cylinder, the yokes are turned in the opposite direction. The fluid means for operating the pistons is of course not limited to any particular fluid. However oil has proven itself extremely adaptable for the purpose. Fluid supply and control means are not shown as it is to be understood that there are a number of such means known to the art which will be adaptable for this purpose.

While in the foregoing description two yokes with their associate ground wheels are shown, I wish it to be understood that the invention is not limited to such construction. It is apparent that the foregoing may be modified. For instance, the beam 15 can be eliminated and but one yoke used, these carrying or being supported by a suitable number of wheels. Or the wheels may be more or less directly connected to the frame and steering means being provided analogous to that employed in automotive vehicles. Or again, other ground supported elements may be employed instead of wheels, such, for instance, as endless track elements.

Draft—Cooperating bulldozer

This invention is intended to be used in conjunction with a copending invention of mine relating to improvements in bulldozers, to the end that when the present invention is being operated the bulldozer is combined therewith, cooperates therewith and becomes a part thereof. This avoids demounting the bulldozer from the tractive or draft means, at the same time simplifying the construction and operation of this invention. The draft means consists of a suitable tractor 35, to each side or track frame 36 of which is secured a suitable bracket (not shown herein, but particularly described in the referred to copending application), and to these brackets the bulldozer is pivotally attached. The bulldozer 37 consists of a curved moldboard 38 carried at each end by a frame or thrust arm 39. These arms as will be seen in the drawings are somewhat triangular in form, and at their apices are provided with pins 40 which seat in the previously mentioned brackets mounted upon the track frame. However one of the pins 40 is not directly carried by a thrust arm but is carried by a tilting device 41 which is pivotally connected by pin 42 to such arm. The tilting device is also pivotally connected by pin 43 to a piston rod 44 operating from cylinder 45 which cylinder is pivotally mounted to the bracket 46 projecting from that particular thrust arm. Movement of piston rod 44 back or forth rocks member 41 upon pin 40, which rocking will either raise or lower pin 42. Inasmuch as pin 42 is the pin upon which one of the thrust arms pivots, the raising or lowering of such pin will raise or lower the thrust arm thereby raising or lowering one end of the moldboard 38.

The unsupported end of frame A, proximate the bottom thereof, is pivotally connected to the bulldozer 37 proximate the lower edge of the latter member by means of pin 47. Projecting from the forward end of frame A, and which may be continuations of the side members 1, are coupling tongues 48 which cooperate with coupling brackets 49 on arms 39. Tongues 48 have a number of bores 48' which receive the pins or bolts 50 extended through bracket 49. Mounted upon beam 3 are a pair of brackets 51, each mounted opposite a thrust arm 39 to which are pivotally connected the piston rods 52 operated by pistons in cylinders 53. One of said cylinders (two in this instance) is rockably attached to the heretofore indicated bracket 46 on one of the thrust arms 39, and the other cylinder is attached in a like manner to a similar bracket 46' on the other thrust arm. Fluid provision and control means (not shown) are used in connection with the cylinders, and their operation is as follows. When the piston rods 52 move out or proceed from cylinders 53 the upper portions of frame A and bulldozer 37 are forced apart, however in view of the fact that the lower parts are held together by means of pins 47 a jack-knife or buckling action is obtained, the lower pivotally connected portions of bulldozer and frame rise toward the line of separation extending between the points where the piston rods are secured to frame A and the cylinders to the bulldozer. This operates as means for raising the forward end of the frame and the bulldozer. A recession of the pistons, on the other hand, permits the cooperating members to lower. It is to be understood that during the operation just described the bolts 50 are removed from the apertures in the coupling tongues and brackets 48 and 39. After the members have been raised or lowered as described, the bolts 50 are reinserted in tongue and brackets and the supporting strain is assumed thereby. The tongues 48 are provided with a number of holes 48' so that one or another will be in position to receive the bolt 50 in accordance with the operation just described.

While I have shown a scraper frame or body being used in association with a bulldozer, it will be apparent as the description progresses that the operation of the scraper is not entirely dependent upon such association. Modifications in the construction coming within the scope of the invention would include the substitution of a suitable end for the scraper to replace the bulldozer, the scraper body being carried either by the draft means or suitable ground supported elements such as wheels or endless track elements.

*Hopper and scraper bottom*

The bottom of frame A is provided with two pivoted or hinged members or blades which when closed constitute the bottom of the hopper 2 and enable it to carry loads, and when open operate as scrapers scraping earth into the hopper 2. These bottom-scrapers or blades are herein indicated by numbers 60 and 60', respectively extend the width of frame A, and are provided with end brackets 61 and two intermediate brackets 62. The end brackets are pivotally connected by means of pins 63 to the frame brackets 64 mounted to the frame A or sides 1. The latter construction permits the forward edge of scraper 60 to raise and lower upon its pivoted rear edge, and the rear edge of scraper 60' to raise and lower upon its pivoted forward edge. The intermediate brackets 62, by means of pins 62', pivotally secure the blades or bottoms 60, 60' to the upright support members 65, the latter being secured to the V-member 4. Mounted in the bearings 66 and 66' upon beam 3' and longitudinal member 10 respectively is a shaft 67; and in like manner mounted in bearings 68 and 68' secured to beam 3 and longitudinal member 10 respectively is a shaft 69. Spaced levers 70 are secured to shaft 69, and a like pair 70' to shaft 67. Rockably secured to the cylinder support member 11 by spaced ears 71 at their ends through which are inserted pins 72 penetrating such support member, are the cylinders 73 and 73' having operating piston rods 74 and 74' respectively, which piston rods are operated by a suitable piston within the respective cylinders. By means of pins 75 the piston rods 74 and 74' are connected to the levers 70 and 70' respectively.

Paired leavers 76 are mounted to shaft 67, one pair over each of the members 62 on blade 60', and like paired levers 76' are mounted upon shaft 69, a pair over each member 62 on blade 60. Connecting the paired levers and the members 62 are links 77, a pivotal connection being provided by means of pins 78 and 79. From the foregoing construction it will be seen that progression or recession of piston rod 74 in cylinder 73 will operate lever 70, shaft 69, levers 76, which levers through the medium of link 77 will raise or lower the bottom or scraper 60. The same is true of cylinder 73', piston rod 74', lever 70', shaft 67, lever 76', link 77, the progression or recession of such piston rod operating through the subsequently mentioned elements to raise or lower bottom or scraper 60'. The pistons, as in the previously mentioned cylinders, are fluid operated, the fluid control means and supply not being shown as such means are well known in the art.

As previously indicated, the rear edge of scraper 60', here indicated by the numeral 80', raises and lowers, and the forward edge of scraper 60, here indicated by number 80 raises and lowers. Inasmuch as they are used for penetrating the earth surface, they are provided with suitable cutters or shear edges 81 and 81' respectively, and in order to brace them longitudinally, they are also provided with inverted V-shaped bracing members 82 and 82' proximate their edges.

The foregoing completes the description of the present invention. As previously indicated, it is particularly suitable for highway and similar grade construction purposes, as it is capable of operating in an area having lateral restrictions, such as on narrow fills, in narrow cuts, and the like, as it is not necessary to turn or reverse the mechanism when it is desired that the direction of its travel be reversed.

In operation, bulldozer 39 is connected to the rear of a suitable tractor, and the frame A connected therewith as previously described. Attachment of the apparatus to the rear of the tractor allows for unobstructed view of mechanism and the terrain over which it operates by the tractor operator, it being understood that such operator operates both tractor and the present machine. Furthermore such attachment takes advantage of the load drawing mechanism usually provided at the rear of such tractors.

When operating the scraper is moved forward or backward, which is to the right or left respectively in Figure 6. If the scraper is utilized for raising or removing earth, when moving forward the scraper blade 60 is lowered, and when moving backward, the blade 60' is lowered. The blades are lowered so that their cutting edges 81 and 81', as the case may be, penetrate the earth surface. This penetration in view of the propulsion of the scraper, will tend to shave the surface earth, which by reason of the movement is carried into hopper 2. After the hopper has become sufficiently filled, the scraper bottom is raised to the position shown by the bottom 60. Thereafter, the scraper is propelled to the place where the earth carried thereby is to be deposited, as, for instance, where a fill is being constructed. When it is desired to unload the earth, one or both bottoms are raised to the position shown by the outline of member 60 in Figure 6, in order that the earth may run out of the bottom of the hopper through the spacings each side of the blades. As it runs out of the bottom of the hopper it is leveled by the end 5 or the moldboard 38 in accordance with the direction of movement of the scraper. In filling hopper 2 the scraper may be run back and forth over a particular area, in which event, when traveling forward blade 60 is lowered and 60' raised, and when traveling backward, blade 60 is raised and 60' lowered.

In its movements, back and forth, the scraper is guided by means of the steering apparatus operating upon the ground supported elements 27. Inequalities in the surface of the area traveled are compensated by the bolster 15. This member being connected to frame A by a horizontal pivot permits the yokes to assume, when necessary, unlike vertical positions, as when depressions and elevations are met in the line of travel of the apparatus.

Vertical positioning of the scraper is attained by means of the pivotal connection 50 between scraper and bulldozer 39 and the operation of the piston rods operating from cylinders 53 and connected to the upper portion of the frame, thus spreading of those portions raises the frame, and an opposite operation lowers the frame. The vertical position of the rear end of the frame is obtained by the means previously described. In the event that the bulldozer is eliminated, suitable means may be provided between tractor and frame for raising and lowering such frame. In the event that the frame is carried on other ground supported elements, other than tractor or bulldozer suitable elevating and lowering means would then be provided in connection with such elements.

In closing it may be stated that this invention is particularly suitable for operation in isolated districts wherein it is difficult to introduce heavy machinery, for in the present instance the introduction of a separate bulldozer and a separate scraper is obviated, the apparatus in this instance being the two in one, and when so desired the scraper may be demounted from the bulldozer, thus permitting that implement to function independently of the scraper.

Having described my invention, I claim:—

1. In combination, a hopper body open at one end, ground supported elements at and supporting its other end, the first end being unsupported, a draft supported bulldozer closing the open end of the hopper and supporting the unsupported end of the frame including construction providing for a common pivotal relationship between body and bulldozer whereby they may be rocked opposite to one another with a consequent elevation or depression of their mutual axis for the purpose of elevating or depressing the adjacent end of the body and the bulldozer, scraper blades constituting the bottom of the hopper, such blades being pivoted to allow one edge thereof to raise and lower, including earth cutting means along such edge whereby as the body progresses earth is scooped into the hopper, and means for raising and lowering the blades.

2. In combination a body providing a hopper open at one end, ground supported elements at and supporting the other end thereof, the first end being unsupported, a draft supported bulldozer closing the open end of the hopper and supporting the unsupported end of the body including construction providing for a common pivotal relationship between body and bulldozer whereby they may be rocked with a consequent elevation or depression of their mutual axis for the purpose of elevating or depressing the bulldozer and the supported end of the body, blades forming the bottom of the hopper and each pivoted to allow one edge thereof to raise and lower including earth cutting means along such edge whereby the blade may be lowered sufficiently to scoop earth into the hopper when the body is progressed over the ground.

3. The combination as set forth in claim 2 including power means for raising and lowering the blades.

4. The combination as set forth in claim 2 including a fluid operated mechanism for raising and lowering the blades.

5. The combination of a body constituting a hopper open at one end, ground supported elements supporting the other end thereof, means for controlling the direction of travel of the ground supported elements, the first end of the body being unsupported, a draft supported member closing the open end of the hopper and supporting the unsupported end of the body including construction providing a flexible coupling between body and draft supported member whereby they may be relatively moved with a consequent elevation or depression of both members, bottom members to the hopper arranged to raise and lower, and when lowered being in position to penetrate and scoop earth into the hopper.

6. In combination a body constituting a hopper open at one end, guidable ground supported members at and supporting the other end thereof, the first end of the body being unsupported, and a draft supported member closing the open end of the body including construction providing for a coupling between body and draft supported member whereby they may be buckled upon the coupling for the purpose of raising the draft supported member and the coupled end of the body.

7. In combination a body constituting a hopper, guidable ground supported elements at and supporting one end thereof, the other end of the body being unsupported, a draft supported bulldozer supporting the latter end including a connection between body and bulldozer upon which they may be buckled for the purpose of raising body and bulldozer, and means for buckling the body and the bulldozer.

8. The invention as set forth in claim 7 including adjustable scraper blades constituting the bottom of the hopper operable to scoop earth into such hopper.

9. The invention as set forth in claim 7 wherein the buckling means contemplates forcing apart of juxtapositioned portions of body and bulldozer.

10. In combination a scraper frame having a hopper body and a draft supported member, said member enclosing one end of said hopper and supporting such end of the frame, a horizontally rockable bolster at the opposite end of the frame, yokes having a vertical axis in said bolster, ground supported members mounted to the yokes and supporting the latter end of the frame, and means for moving said yokes in unison on their vertical axes in order to govern the direction of travel of said ground supported members.

11. A scraper including a body constituting a hopper, ground supported elements carrying such body, including construction for controlling the direction of travel of such elements, members constituting the bottom of the hopper and adjustable with regard to the body to a plurality of positions, one being to a position to scoop earth into the hopper, another being to close the bottom of the hopper, and the last being to a position allowing earth in the hopper to escape through the bottom thereof.

12. In combination a scraper frame having a hopper body and a draft supported bulldozer, one end of said body being closed and the opposite end being defined by the bulldozer which supports such end, the end of the frame opposite the bulldozer having a horizontally rockable member, a pair of yokes having a vertical axis in said member, ground wheels mounted to said yokes, and means for moving the yokes in unison on their vertical axes in order to control the direction of travel of said ground wheels.

13. A scraper including a hopper body having bottom sections each positionable to scoop earth into the hopper, to retain earth in the hopper, and to permit earth to escape therefrom; ground supported elements carrying said body, and a steering mechanism associated with certain of the ground supported elements operable to control the direction of travel of the body.

14. A scraper including a hopper body having bottom sections each positionable to scoop earth into the hopper, to retain earth in the hopper, and to permit earth to escape therefrom; and ground supported elements carrying said body.

15. In combination a scraper body and a bulldozer, said members having an adjustable connection whereby spreading apart of juxtapositioned portions thereof operates to raise such members, means for attaining such separation, and fastening means for securing the scraper body and bulldozer against relative movement.

16. The combination including a scraper having a hopper body, a bulldozer flexibly supporting and enclosing one end of the hopper, ground traveling elements supporting the other end of the body, means for controlling the direction of travel of the ground traveling elements, and a pivotal and sectional construction to the bottom of the hopper operable to optionally scoop earth into the hopper, support earth therein, or to discharge earth therefrom.

17. A scraper having a hopper body, ground supported elements carrying one end of the body, including means for raising and lowering such body end relative to the ground supported elements, the other end being supported by draft means, buckling means for raising and lowering the other end of the body, and a sectional bottom to the hopper each section being adjustable to a position to scoop earth into the hopper, to a position to retain earth in the hopper, and to a position wherein earth in the hopper may escape through the bottom thereof.

18. In combination, a hopper body having ground traveling support means, and a draft supported bulldozer enclosing a portion of the hopper body.

19. In combination, a hopper body having ground traveling support means supporting a portion thereof, and a draft supported bulldozer enclosing a portion of the hopper body and supporting the remainder thereof.

20. In a scraper, a hopper body and a bottom therefor formed of movable sections, said sections each being movable to a position within the bottom plane to close the bottom of the hopper, to a position above the plane of the bottom to discharge earth from the hopper, and to a position below the plane of the bottom to scoop earth into the hopper.

McLENNEN C. SLATE.